US005469776A

United States Patent [19]

Martensen et al.

[11] Patent Number: 5,469,776

[45] Date of Patent: Nov. 28, 1995

[54] HYDRAULIC PUMPING DEVICE

[75] Inventors: Lars Martensen, Soenderborg; Ove T. Hansen, Nordborg; Henry M. Moeller, Soenderborg; Hardy Jepsen, Nordborg, all of Denmark

[73] Assignee: Danfoss A/S, Denmark

[21] Appl. No.: 274,246

[22] Filed: Jul. 13, 1994

[51] Int. Cl.[6] .............................. F01B 11/02; F16J 10/00; F16J 9/00

[52] U.S. Cl. .............................. 92/170.1; 92/187; 92/248

[58] Field of Search .............................. 92/170.1, 248, 92/71, 12.2, 187; 417/269

[56] References Cited

U.S. PATENT DOCUMENTS

| | | | |
|---|---|---|---|
| 3,183,848 | 5/1965 | Raymond . | |
| 3,418,942 | 12/1968 | Partos | 417/269 |
| 3,746,476 | 7/1973 | Bradley | 417/269 |
| 4,519,119 | 5/1985 | Nakayama et al. | 92/248 |
| 4,683,803 | 8/1987 | Miller et al. | 417/269 |
| 5,131,818 | 7/1992 | Wittkup | 417/273 |

FOREIGN PATENT DOCUMENTS

| | | | |
|---|---|---|---|
| 1267985 | of 0000 | Germany . | |
| 2118712 | of 0000 | Germany . | |
| 16533529 | of 0000 | Germany . | |
| 0161981 | 12/1980 | Japan | 92/248 |
| 0041980 | 2/1987 | Japan | 417/269 |
| 2-125979 | 5/1990 | Japan . | |
| PCT/DK94/00021 | of 0000 | WIPO . | |
| PCT/DK94/00443 | of 0000 | WIPO . | |
| PCT/DK94/00001 | of 0000 | WIPO . | |

*Primary Examiner*—Thomas E. Denion
*Attorney, Agent, or Firm*—Lee, Mann, Smith, McWilliams, Sweeney & Ohlson

[57] ABSTRACT

A hydraulic pumping device for use in a hydraulic machine having a piston and slider shoe unit made of a combination of plastic and metal material to operate with virtually lubricant free fluid.

16 Claims, 1 Drawing Sheet

HYDRAULIC PUMPING DEVICE

BACKGROUND OF THE INVENTION

1. Field of Invention

The present invention is generally related to hydraulic machines, and specifically relates to a hydraulic pumping device of a plastic and metal construction utilizing virtually lubricant free fluid.

2. Description of the Prior Art

Hydraulic piston machines, such as the one described in PCT/DK94/00001, comprise at least one piston and cylinder where the piston movement is controlled by an incline plate, otherwise known as a control surface. Each piston is placed into a cylinder contained within a cylinder drum and lies on the control surface via the intermediary of a slider shoe. The piston and slider shoe unit operates either axially or radially. In both cases, however, the movement of the piston is restricted by way of the control surface, that is, as the piston moves, the angular position of the slider shoe changes. Hence, by altering the inclination of the control surface, the stroke volume of the piston is changed.

The piston and slider shoe act as a unit and form a first contact surface. The slider shoe and control surface form a second contact surface. During the operation of the hydraulic machine, through movement of respective parts, friction occurs at both the first and second contact surfaces. To reduce friction and wear and tear on the parts, contact surfaces are typically lubricated with hydraulic fluid. The choice of hydraulic fluids, however, is restricted to those liquids which provide satisfactory lubrication. Moreover, many hydraulic fluids such as synthetic oils are disfavored in the ever expanding debate on environmental protection, and replacing these oils is possible only to a limited extent since satisfactory lubrication is not ensured in all cases.

Hydraulic machines known to those skilled in the art utilize a number of different techniques to fix the slider shoe to the piston and reduce or eliminate the need for hydraulic fluid. Each technique attempts to ensure that the movement between the slider shoe and piston is maximized. For example, it is well known in the art to join the slider shoe and piston to one another by way of a ball and socket joint. U.S. Pat. No. 3,183,848 illustrates a pump having an axially operating piston in which the slider shoe is made of nylon and is secured to the ball of the ball and socket joint by means of a metal clip.

More recently, to eliminate the need for hydraulic lubricating fluid, a piston and slider shoe unit has been developed with a friction reducing layer. This layer comprises a plastic material mixed with fibers for use between the slider shoe and the control surface as shown in JP 2-125 979A. Although capable of reducing friction between these moving parts, fixing a separate layer to the slider shoe is relatively complicated. The contact surface must first be roughened or grooved so that the friction reducing layer may be secured to the surface with an adhesive. And because the adhesive bond is stressed with primarily shearing forces, there is a risk that the bond will not hold, and the plastic layer will detach and damage the machine. Stability and strength of the piston and slider shoe unit is also compromised. Moreover, there is a risk that the too much friction will develop between the piston and slider shoe which ultimately leads to the joint seizing or binding, again, risking damage to the hydraulic machine.

Hence, use of the friction reducing layer has been expanded to more than one contact surface as demonstrated in PCT Application No. PCT/DK93/00443. While safeguarding two or more contact surfaces, this friction reducing layer has several disadvantages. First, like the single friction reducing layer, this plastic layer is a functionally separate machine element, and may be displaced by forces on either component. Second, hydraulic fluid under pressure may penetrate between the friction reducing layer and the slider shoe, destroying the cohesion between the contact surfaces and the friction reducing layer. Third, although essentially replacing the lubricating function of hydraulic fluid, if the materials of the friction reducing layer are not correctly matched to the material of the moving part, the coefficients of friction between the reducing layers will not be comparable with the coefficients of friction of a liquid lubricated contact surface. Lastly, to construct a three dimensional friction reducing layer is complicated. While it is preferable for the friction reducing layer to be in the form of a molded part which increases dimensional tolerances, any dimensional inconsistencies must be back-filled during molding. Moreover, surface structures such channels or pockets in the friction reducing layer are preferred for molded parts. Such structures serve to relieve the hydrostatic pressure between the slider shoe and the control surface, and equalize forces in order to stabilized the slider shoe. However, this also complicates the molding process.

A need exists therefore, for a simpler, more reliable and cost efficient hydraulic pumping device that reduces friction between contact surfaces to an operative level without the need for lubricating fluid.

SUMMARY OF THE INVENTION

The present invention is a hydraulic pumping device of plastic and metal construction for use in a hydraulic machine without the need for a lubricating fluid. Preferably, the subject invention comprises a metal cylinder, a piston and slider shoe unit having a plastic piston and a metal slider shoe operatively connected to the plastic piston, a plastic control surface, and a plastic support for holding the slider shoe in engagement with the control surface. The plastic control surface engages the metal slider shoe whereby the plastic piston is reciprocated in the metal cylinder upon movement of the control surface while the metal slider shoe rotates.

Consequently, the subject invention has contact surfaces between: (1) the metal slider shoe and the plastic piston, (2) the metal slider shoe and the plastic control plate, (3) the plastic support and the metal slider shoe, and (4) the metal cylinder and plastic piston. Each contact surface maintains a low coefficient of friction during operation of the hydraulic device without need for friction reducing hydraulic fluids. The lubricating function which was otherwise performed by a continual fresh supply of hydraulic fluid, for example, an oil, is now replaced by the use of materials with coefficients of friction low enough to avoid overheating and excessive wear and tear on the moving parts.

Many hydraulic machines, such as the one referred to above and described in PCT/DK94/00001, comprise several pistons, for instance as many as five or more, where each piston is placed into a cylinder contained within a cylinder drum made of metal. Hence, each plastic piston fits into one metal cylinder of the metal cylinder drum.

The metal/plastic combination of elements of the present invention allows a hydraulic machine incorporating this device to be subject to the same forces as an all metal device, and to operate under high pressure. The mechanical stability and load rating of the hydraulic machine is fundamentally unaffected by use of this combination of materials. Also, the strength and stability of the overall hydraulic machine is determined by the construction of the cylinder body and associated pressure plate(s).

Moreover, the uniform, integral construction of both the piston and the slider shoe, as opposed to the addition of a friction reducing layer around the slider shoe, has several advantages. First, one less dement is required as part of the piston and slider shoe unit. Second, the friction reducing element cannot be separated from the slider shoe, as it is an inherent part of the device. Third, the piston and slider shoe unit need not be designed around the adhesion characteristics of a separate friction reducing layer.

Fourth, without the addition of a separate layer, the construction of the piston and slider unit is simplified. In fact, preferably, the plastic piston is molded during the assembly operation so that complete construction of the piston and metal slider shoe is performed in one operation. Therefore, it is not necessary to manufacture separately two different parts which later will be assembled together. Lastly, by utilizing plastic components having very low coefficients of friction, friction between moving parts is dramatically reduced, as is wear and tear of the overall hydraulic machine.

Therefore, the hydraulic pumping device of the present invention has the ability to operate with a fluid having relatively poor or virtually no lubricating properties such as water. The term, virtually lubricant free fluid, as referred to herein, means that displaced water need not have lubricants added to it for the purposes of lubricating the pump. Also, a slight contamination of the water may occur, for example, via units provided upstream of a high pressure water pump, and cannot be avoided. This will not effect the efficiency of the device. The hydraulic pumping device of the present invention provides a simplified, more cost efficient and reliable plastic piston and metal slider shoe unit operating in connection with a plastic control surface without the use of hydraulic lubricating fluids.

It is an object and feature of the present invention to provide a hydraulic pumping device made of a combination of metal and plastic elements of integral construction.

It is a further object and feature of the present invention to provide a hydraulic pumping device having a plastic piston, a metal slider shoe, a plastic control surface, and a metal cylinder of integral construction, without a friction reducing layer, for use with virtually lubricant free fluids.

It is a another object of the present invention to provide a hydraulic pumping device having a piston and slider shoe that is simple to construct and cost effective to make.

It is yet a further object of the present invention to provide a hydraulic pumping device that is reliable during operation of a hydraulic machine.

These and other objects and features of the invention will be readily apparent from the accompanying drawings and detailed description of the preferred embodiment.

DETAIL DESCRIPTION OF THE DRAWINGS

The invention is described in greater detail in the following detailed description of the preferred embodiment providing the best mode of the invention, taken in conjunction with the drawing figures in which.

DETAIL DESCRIPTION OF THE PREFERRED EMBODIMENT

Figure 1:
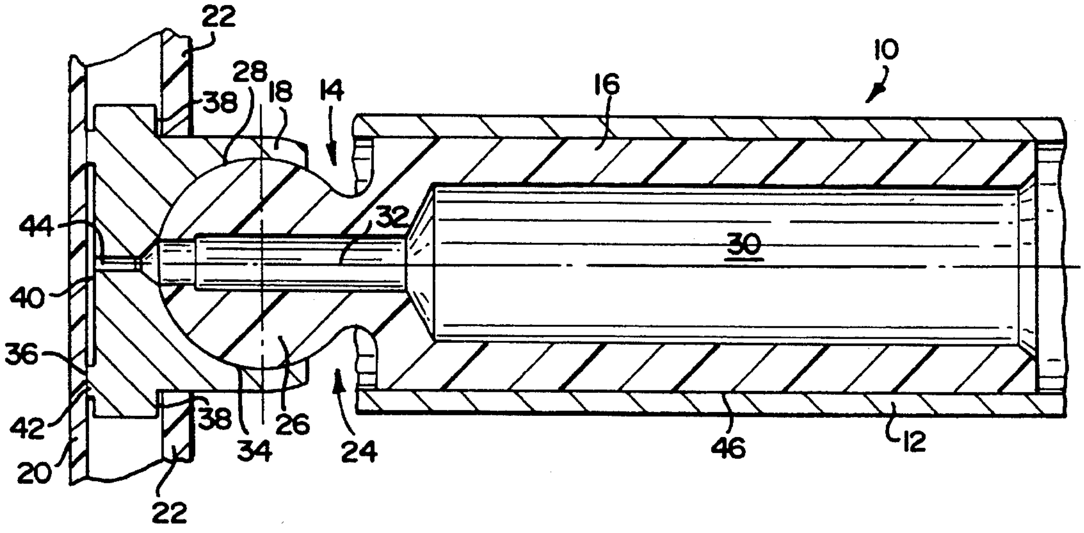
FIG. 1 is a cross-sectional view of the preferred embodiment hydraulic pumping device of the present invention.
Figure 2:
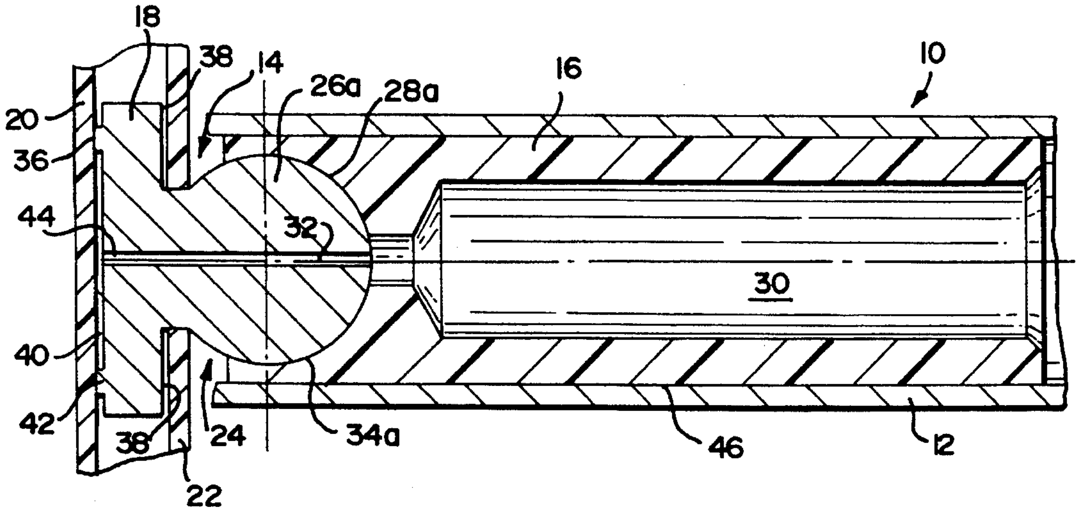
FIG. 2 is a cross-sectional view of the first alternative embodiment of the hydraulic pumping device of the present invention.

FIGS. 1 and 2 represent the preferred embodiments of the present invention designated generally as the hydraulic pumping device 10 for use in a hydraulic machine. The subject invention preferably comprises a metal cylinder 12, a piston and slider shoe unit 14 having a plastic piston 16 and a metal slider shoe 18 operatively connected to the plastic piston 16, a plastic control surface 20 and a plastic support 22 for holding the metal slider shoe 18 in engagement with the plastic control surface 20. The plastic control surface 20 engages the metal slider shoe 18 whereby the piston 16 is reciprocated in the cylinder 12 upon movement of the control surface 20. The metal slider shoe 18 may also rotate during operation.

As shown in FIGS. 1 and 2, preferably, the piston 16 and slider shoe 18 are rotatably connected to one another by way of a ball and socket joint 24. In FIG. 1, the ball and socket joint 24 has a ball 26 integral with the plastic piston 16 and a metal slider shoe 18 having a spherical concave recess 28. Alternatively, as shown in FIG. 2, the ball *26a* is integral with the metal slider shoe 18, and the plastic piston 16 has a spherical concave recess *28a*. In a manner known to those skilled in the art, the plastic piston 16 has a hollow space 30 connected to a continuous bore 32 passing through the ball 26. The continuous bore 32 connects to a continuous opening 44 in the slider shoe 18. The metal slider shoe 18 slides on the plastic control surface 20, which in a hydraulic machine of the axial piston type, can be formed, for example, by the sliding contact face of a wobble plate.

As shown in FIG. 1, a first contact surface 34 is between the metal slider shoe 18 and the ball 26 of the plastic piston 16, a second contact surface 36 is between the metal slider shoe 18 and the plastic control surface 20, a third contact surface 38 is between the metal slider shoe 18 and the plastic support 22, and a fourth contact surface 46 is between the plastic piston 16 and the metal slider shoe 18. Alternatively, in FIG. 2, although the second contact surface 36 remains between the metal slider shoe 18 and the plastic control surface 20, the first contact surface 34 is positioned between the ball *26a* of the metal slider shoe 18 and a concave spherical recess *28a* of the plastic piston 16.

At the second contact surface 36, the metal slider shoe 18 preferably has surface structures, namely recesses 40 and projections 42 on the side facing the plastic control surface 20. The recesses 40 form channels or pockets which are connected by way of the continuous opening 44 in the metal slider shoe 18 to the continuous bore 32 in the ball 26. Additionally, although not shown in the figures, the plastic support 22 preferably has a hole in it so that the plastic piston and metal slider shoe unit 14 can penetrate the support 22 for complete assembling.

By matching the plastic material of the present invention with a suitable metallic material, the coefficients of friction at each contact surfaces 34, *34a*, 36, 38, 46 are comparable with those of a fluid lubricated contact surface. Lubrication by means of the hydraulic fluid can therefore be dispensed with. Except during start up where other coefficients of friction must taken into consideration, the coefficients of friction are dependent on both the load and the rotation. Moreover, the plastic support 22 may be made of metal surrounded by plastic in order to achieve the necessary strength. The plastic/metal combination prevents steel on steel friction, so that the efficiency of the hydraulic pumping device 10 of the present invention remains high, and wear and tear on the individual components is limited. In addition, because the plastic piston 16 and the cylinder 12 have the same combination of materials and the coefficient of friction remains low between the plastic piston 16 and the metal cylinder 12, the efficiency of the overall hydraulic pumping device 10 is enhanced.

Hence, in the subject invention, both the metal slider shoe 18 and metal cylinder 12 are uniformly and integrally comprised of a metallic material. A variety of metals may be utilized for the metal slider shoe 18 and cylinder 12. The preferred metallic material is stainless steel. Steel makes very strong components, having the ability to withstand the pressure of most well known hydraulic machines. However, any metal can be used, provided it has the hardness to withstand the pressures of the hydraulic machine. Metal hardness may be derived from the consistency of the metal itself, or it may be achieved, for example, by a hardening process.

Similarly, a variety of plastic materials may be considered for the plastic elements of the hydraulic pumping device 10, that is, the plastic piston 16, control surface 20, and support 22. The plastic material of the present invention is preferably selected from the group of high strength thermoplastic plastic materials based on polyaryl ether ketone, in particular, polyether ether ketone, polyamide, polyacetals, polyaryl ethers, polyethylene terphthalates, polyphenylene sulphides, polysuphones, polyether polacrylates, phenol resins such as novolak resins or similar substances, glass, graphite, polytetraflouroethylene or carbon, especially in fiber form, being used as fillers. Although polyether ether ketone (PEEK) is the preferred plastic material, other plastic materials made by other manufacturers have just as good qualities and serve the same purposes as PEEK. In this event, water is suitable as the hydraulic fluid. In addition, if desired, plastic components may be reinforced with metal, that is, metal surrounded by plastic material, to strengthen the individual component.

Preferably, in manufacturing the plastic piston and slider shoe unit 14 of the subject invention, the plastic piston 16 is molded. This molding process occurs during a single assembly operation of the piston and slider shoe unit 14. Hence, the molding process takes place only at the time the part is needed and it is not necessary, thereafter, to assemble the metal slider shoe 18 and plastic piston 16 in a separate operation.

Furthermore, the present invention encompasses yet another possible construction. In this embodiment, the above cited metal components are made of plastic and the above cited plastic components are made of metal. In other words, this alternative hydraulic pumping device includes a plastic cylinder, a metal piston and plastic slider shoe unit having a metal piston and a plastic slider shoe operatively connected to the metal piston, a metal control surface and a metal support for holding the plastic slider shoe in engagement with the metal control surface.

It must be understood that certain variations in the construction and materials of the hydraulic pumping device of the subject invention can be made without departing from the scope of the present invention.

We claim:

1. A hydraulic pumping device for use with virtually lubricant free fluid comprising:

a metal cylinder;

a piston and slider shoe unit, said unit comprising a plastic piston and a metal slider shoe operatively connected to said plastic piston, said plastic piston slidable within said metal cylinder;

a plastic control surface, said plastic control surface engaging said metal slider shoe whereby said plastic piston is reciprocated in said metal cylinder upon movement of said plastic control surface; and a plastic support for securing said metal slider shoe in engagement with said plastic control surface, said plastic support engaging said metal slider shoe.

2. The hydraulic pumping device of claim 1 wherein said plastic piston operates axially within said metal cylinder.

3. The hydraulic pumping device of claim 1 wherein said metal slider shoe unit rotates within said plastic support.

4. The hydraulic pumping device of claim 1 wherein said plastic piston and said metal slider shoe unit comprise a ball and a socket coupled together forming a ball and socket joint connection.

5. The hydraulic pumping device of claim 4 wherein said socket comprises a spherically concave recess to receive said ball.

6. The hydraulic pumping device of claim 4 wherein said slider shoe comprises said ball, and said piston comprises said socket.

7. The hydraulic pumping device of claim 3 wherein said piston comprises said ball, and said metal slider comprises said socket.

8. The hydraulic pumping device of claim 7 wherein said metal slider shoe comprises a plurality of recesses and projections at said second contact surface.

9. The hydraulic pumping device of claim 1 wherein said plastic piston, said plastic control surface and said plastic support plate comprise a plastic material selected from the group consisting of polyether ether ketones, polyamides, polyacetals, polyaryl ethers, polyethylene terphthalates, polyphenylene sulphides, polysuphones, polyether polacrylates, and phenol resins.

10. The hydraulic pumping device of claim 8 wherein said plastic piston, said plastic control surface and said plastic support plate further comprise a filler material selected from the group consisting of glass, graphite, polytetraflouroethylene or carbon.

11. The hydraulic pumping device of claim 1 wherein said metal slider shoe and said metal cylinder comprise stainless steel.

12. A hydraulic pumping device for use with virtually lubricant free fluid comprising:

a plastic cylinder;

a metal piston and plastic slider shoe unit, said unit comprising a metal piston and a plastic slider shoe operatively connected to said metal piston, said metal piston slidable within said plastic cylinder;

a metal control surface, said metal control surface engaging said plastic slider shoe whereby said metal piston is reciprocated in said plastic cylinder upon movement of said metal control surface; and a metal support for securing said plastic slider shoe in engagement with said metal control surface, said metal support engaging said plastic slider shoe.

13. The hydraulic pumping device of claim 12 wherein said metal control surface, said metal piston, and said metal support comprises stainless steel.

14. The hydraulic pumping device of claim 12 wherein said plastic cylinder and said plastic slider shoe comprises a material selected from the group consisting of polyether ether ketones, polyamides, polyacetals, polyaryl ethers, polyethylene terphthalates, polyphenylene sulphides, polysuphones, polyether polacrylates, and phenol resins.

15. The hydraulic pumping device of claim 1 wherein said plastic piston is molded.

16. The hydraulic pumping device of claim 15 wherein said piston and slider shoe unit is assembled in a single operation.

* * * * *